(12) United States Patent
Somekh et al.

(10) Patent No.: US 9,582,767 B2
(45) Date of Patent: Feb. 28, 2017

(54) MEDIA RECOMMENDATION USING INTERNET MEDIA STREAM MODELING

(75) Inventors: Oren Somekh, Bet-Yehoshua (IL);
Yehuda Koren, Zichron Yaakov (IL);
Natalie Aizenberg, Natanya (IL)

(73) Assignee: EXCALIBUR IP, LLC, Sunnyvale, CA (US)

(*) Notice: Subject to any disclaimer, the term of this patent is extended or adjusted under 35 U.S.C. 154(b) by 88 days.

(21) Appl. No.: 13/473,034

(22) Filed: May 16, 2012

(65) Prior Publication Data
US 2013/0311163 A1    Nov. 21, 2013

(51) Int. Cl.
*G06F 17/30* (2006.01)
*G06N 99/00* (2010.01)

(52) U.S. Cl.
CPC .................................. *G06N 99/005* (2013.01)

(58) Field of Classification Search
CPC ......... G06F 17/30029; G06F 17/30032; G06F 17/30035; G06F 17/3069; G06F 17/3072; G06F 17/30817; G06F 17/30828; G06F 17/30964
USPC ....... 707/767, 748, 776, 751, 754; 705/26.7, 705/46; 706/12, 46, 20, 21
See application file for complete search history.

(56) References Cited

U.S. PATENT DOCUMENTS

| | | | | |
|---|---|---|---|---|
| 7,454,509 B2 * | 11/2008 | Boulter | ............. | G06F 17/30029 705/12 |
| 7,567,958 B1 * | 7/2009 | Alspector et al. | | |
| 7,730,074 B1 * | 6/2010 | Stoutamire | ....... | G06F 17/30864 707/749 |
| 7,769,757 B2 * | 8/2010 | Grefenstette et al. | ........ | 707/736 |
| 8,005,724 B2 * | 8/2011 | Dunning et al. | ............. | 705/26.7 |
| 8,037,080 B2 * | 10/2011 | Koren | ........................... | 707/754 |
| 8,171,032 B2 * | 5/2012 | Herz | ............................. | 707/748 |
| 8,175,989 B1 * | 5/2012 | Gopinath | ............... | G06N 7/005 706/45 |
| 8,180,804 B1 * | 5/2012 | Narayanan et al. | .......... | 707/798 |
| 8,260,656 B1 * | 9/2012 | Harbick et al. | .............. | 705/7.31 |

(Continued)

OTHER PUBLICATIONS

D. Agarwal and B.-C. Chen. Regression-based latent factor models. In KDD, pp. 19-28, 2009.

(Continued)

*Primary Examiner* — Mariela Reyes
*Assistant Examiner* — Thong Vu
(74) *Attorney, Agent, or Firm* — James J. DeCarlo; Greenberg Traurig LLP

(57) ABSTRACT

Media item recommendations, such as music track recommendations, may be made using one or more models generated using data collected from a plurality of media stream sources, such as, for example, Internet radio stations. In an initial, bootstrapping phase, data about media items and media stream playlists of media stream sources may be used to generate a model, which comprises latent factor vectors, or learned profiles, of media items, e.g., tracks, artists, etc. Such a bootstrapping phase may be performed without user data, such as user playlists and/or user feedback, to generate a model that may be used to make media item recommendations. As user data becomes available, e.g., as users of a recommendation service provide user data, the user data may be used to supplement and/or update the model and/or to create user profiles.

30 Claims, 5 Drawing Sheets

(56) References Cited

U.S. PATENT DOCUMENTS

| | | | |
|---|---|---|---|
| 8,344,233 B2* | 1/2013 | Cai | G10H 1/0058 700/94 |
| 8,407,230 B2* | 3/2013 | Slaney et al. | 707/748 |
| 8,478,768 B1* | 7/2013 | Pathak | G06Q 30/0282 707/754 |
| 8,560,553 B2* | 10/2013 | Bentley | G06F 17/30053 707/748 |
| 8,566,256 B2* | 10/2013 | Hueter et al. | 706/12 |
| 9,077,951 B2* | 7/2015 | Hirano | H04N 5/782 |
| 2002/0082901 A1* | 6/2002 | Dunning et al. | 705/10 |
| 2003/0037041 A1* | 2/2003 | Hertz | 707/1 |
| 2004/0249776 A1* | 12/2004 | Horvitz | G06Q 10/109 706/21 |
| 2005/0238207 A1* | 10/2005 | Tavares | G06K 9/00885 382/115 |
| 2006/0218187 A1* | 9/2006 | Plastina et al. | 707/104.1 |
| 2007/0022057 A1* | 1/2007 | Benson | G05B 13/0275 705/59 |
| 2007/0220552 A1* | 9/2007 | Juster et al. | 725/46 |
| 2008/0082485 A1* | 4/2008 | Church | G06F 17/30657 |
| 2009/0006368 A1* | 1/2009 | Mei | G06F 17/30796 |
| 2009/0043547 A1* | 2/2009 | Kirby | G06F 17/175 703/2 |
| 2009/0089265 A1* | 4/2009 | Saito | G06F 17/3089 |
| 2009/0248599 A1* | 10/2009 | Hueter et al. | 706/20 |
| 2010/0058237 A1* | 3/2010 | Nishizaki | G06F 9/4446 715/812 |
| 2010/0100416 A1* | 4/2010 | Herbrich et al. | 705/10 |
| 2010/0125539 A1* | 5/2010 | Aucouturier | G06F 17/30265 706/12 |
| 2010/0169328 A1* | 7/2010 | Hangartner | 707/751 |
| 2011/0029464 A1* | 2/2011 | Zhang | G06N 99/005 706/12 |
| 2011/0035379 A1* | 2/2011 | Chen | G06F 17/30536 707/740 |
| 2011/0093495 A1* | 4/2011 | Connell | 707/769 |
| 2011/0153663 A1* | 6/2011 | Koren et al. | 707/776 |
| 2011/0225496 A1* | 9/2011 | Jeffe | G11B 27/034 715/716 |
| 2011/0276512 A1* | 11/2011 | Asikainen | G06Q 30/0282 705/347 |
| 2011/0289015 A1* | 11/2011 | Mei et al. | 705/347 |
| 2011/0314039 A1* | 12/2011 | Zheleva et al. | 707/767 |
| 2012/0030159 A1* | 2/2012 | Pilaszy et al. | 706/46 |
| 2012/0117015 A1* | 5/2012 | Sathish | 706/47 |
| 2012/0130931 A1* | 5/2012 | Koren et al. | 706/46 |
| 2012/0158622 A1* | 6/2012 | Mital | G06Q 50/01 706/12 |
| 2012/0278268 A1* | 11/2012 | Hamalainen et al. | 706/46 |
| 2013/0018960 A1* | 1/2013 | Knysz et al. | 709/204 |
| 2013/0073569 A1* | 3/2013 | Lee | G06Q 30/02 707/749 |
| 2013/0151462 A1* | 6/2013 | Ledlie | 706/54 |
| 2013/0166555 A1* | 6/2013 | Pfaff | 707/737 |
| 2013/0198122 A1* | 8/2013 | Baughman | G06N 99/005 706/45 |

OTHER PUBLICATIONS

X. Amatriain, J. Bonada, Alex Loscos, J. L. Arcos, and V. Verfaille. Content-based transformations. Journal of New Music Research, 32:2003, 2003; 20 pages.

Y. Bengio and J.-S. Senécal. Quick training of probabilistic neural nets by sampling. In Proc. 9th International Workshop on Artificial Intelligence and Statistics (AISTATS'03), 2003; 9 pages.

M. Castelluccio. The music genome project. Strategic Finance, vol. 88:3 pages, 2006.

B. Fields, C. Rhodes, and M. d'Inverno. Using song social tags and topic models to describe and compare playlists. Barcelona, Sep. 2010. ACM, ACM; 8 pages.

T. Hofmann. Latent semantic models for collaborative filtering. ACM Trans. Inf. Syst., 22; pp. 89-115, Jan. 2004.

Y. Hu, Y. Koren, and C. Volinsky. Collaborative filtering for implicit feedback datasets. In ICDM, pp. 263-272, 2008.

M. Jamali and M. Ester. A matrix factorization technique with trust propagation for recommendation in social networks. In RecSys, pp. 135-142, 2010.

N. Koenigstein, G. Dror, and Y. Koren. Yahoo! music recommendations: modeling music ratings with temporal dynamics and item taxonomy. In RecSys, pp. 165-172, 8 pages 2011.

Y. Koren. Factorization meets the neighborhood: a multifaceted collaborative filtering model. In KDD, pp. 426-434, 2008; 9 pages.

Y. Koren. Collaborative filtering with temporal dynamics. In KDD, pp. 447-456, 2009.

Y. Koren, R. M. Bell, and C. Volinsky. Matrix factorization techniques for recommender systems. IEEE Computer, 42; 8 pages, 2009.

P. Lamere. Social tagging and music information retrieval. Journal of New Music Research, 37(2):101-114, 2008.

B. Li, Q. Yang, and X. Xue. Transfer learning for collaborative filtering via a rating-matrix generative model. In ICML, 8 pages, 2009.

A. Nanopoulos, D. Rafailidis, P. Symeonidis, and Y. Manolopoulos. Musicbox: Personalized music recommendation based on cubic analysis of social tags. IEEE Trans. on Audio, Speech and Language Processing, 18(2): pp. 407-412, 2010.

R. Pan, Y. Zhou, B. Cao, N. N. Liu, R. M. Lukose, M. Scholz, and Q. Yang. One-class collaborative filtering. In ICDM, 15 pages, 2008.

W. Pan, E. W. Xiang, N. N. Liu, and Q. Yang. Transfer learning in collaborative filtering for sparsity reduction. In AAAI, 6 pages; 2010.

A. Paterek. Improving regularized singular value decomposition for collaborative filtering. Proceedings of KDD Cup and Workshop, 4 pages; 2007.

R. Ragno, C. J. C. Burges, and C. Harley. Inferring similarity between music objects with application to playlist generation. In Proc. 7th ACM SIGMM int. workshop on Multimedia information retrieval, pp. 73-80, 2005; 8 pages.

S. Rendle, C. Freudenthaler, Z. Gantner, and S.-T. Lars. Bpr: Bayesian personalized ranking from implicit feedback. In Proc. 25th Conference on Uncertainty in Artificial Intelligence, UAI '09, pp. 452-461, 2009.

S. Rendle, L. B. Marinho, A. Nanopoulos, and L. Schmidt-Thieme. Learning optimal ranking with tensor factorization for tag recommendation. In KDD, 9 pages, 2009.

R. Salakhutdinov and A. Mnih. Bayesian probabilistic matrix factorization using markov chain monte carlo. In ICML, pp. 880-887, 2008; 8 pages.

R. Salakhutdinov, A. Mnih, and G. E. Hinton. Restricted boltzmann machines for collaborative filtering. In ICML, pp. 791-798, 2007; 8 pages.

M. Schedl and P. Knees. Context-based Music Similarity Estimation. In Proc. 3rd International Workshop on Learning the Semantics of Audio Signals (LSAS 2009), 2009.

M. Slaney. Web-scale multimedia analysis: Does content matter? IEEE MultiMedia, 18(2):12-15, 2011; 4 pages.

Y. Zhang, B. Cao, and D.-Y. Yeung. Multi-domain collaborative filtering. In Proc 26th Conference Annual Conference on Uncertainty in Artificial Intelligence (UAI-10), pp. 725-732, 2010.

E. Zheleva, J. Guiver, E. Mendes Rodrigues, and N. Mili'c-Frayling. Statistical models of music-listening sessions in social media. In Proc. 19th int. conference on World wide web, WWW '10, pp. 1019-1028, 2010.

E. Zheleva, S. Hossam, and L. Getoor, Co-evolution of Social and Affiliation Networks; conference on KDD 2009, Paris, France; 8 pages.

E. Zheleva, S. Hossam, and L. Getoor, To Join or Not to Join: The Illusion of Privacy in Social Networks with Mixed Public and Private User Profiles; International World Wide Web Conference Committee; WWW 2009, Apr. 20-24, 2009, Madrid, Spain; 10 pages.

(56) References Cited

OTHER PUBLICATIONS

Aizenberg, N. Koren Yehuda, and Somekh O.; Build Your Own Music Recommender by Modeling Internet Radio Streams; International World Wide Web Conference Committee; WWW 2012, Lyon, France 10 pages.

* cited by examiner

MEDIA RECOMMENDATION USING INTERNET MEDIA STREAM MODELING

FIELD OF THE DISCLOSURE

The present disclosure provides for media recommendation, such as music recommendations, using one or more models generated using data collected from a plurality of Internet media stream sources, such as, for example, Internet radio stations.

BACKGROUND

The convergence of the media industry with the Internet and the appearance of mobile devices with rich media playing capabilities have created a variety of new services. In particular, nowadays users can consume, buy, share, and review media items in many new exciting ways. Yet, the variety and volume of media items is overwhelming. As a result, users may find it difficult to navigate through the vast variety of new media items and get what they like. To overcome this explosive content volume, helping users find items they like, many new recommendation services have emerged in recent years.

SUMMARY

The present disclosure seeks to address failings in the art and to provide a collaborative filtering (CF) approach that uses playlists of media streams provided by media stream sources, such as without limitation Internet radio stations, to generate a model, or models, which can be used to make recommendations. In a case of music playlists generated by Internet radio stations, a CF model can be used to recommend a track, artist and/or station to a user. Media streams comprising any type of media, e.g., audio, video, multimedia, etc., might be used to generate a model.

Embodiments of the present disclosure address, among other things, a problem that results from an insufficient amount of data to model or profile items. By way of a non-limiting example, data may be past user behavior, e.g., previous user transactions or feedback. Where there is an insufficient amount of data about past user behavior, it is difficult to draw accurate inferences, if any inferences are even able to be drawn, about users and/or items. This problem may be referred to as the cold start problem. Success of a CF approach strongly depends on having a sufficient amount of data, i.e., user transaction and feedback, on record. To illustrate using a simple example involving two users, user A and user B, user transaction and feedback data may be used to draw inferences about them. If the data indicates that user A and user B have similar interests, or like similar items, and the data indicates that user A likes item Y, it can be inferred that user B will probably like item Y. The inference is particularly useful where there is little or no input from user B about item Y to draw a conclusion about user B's interest in item Y.

Where there is an insufficient amount of user data, e.g., user transactions and feedback, to model or profile items, such as media items, the success of a CF approach that must rely on such user data is at best limited. Therefore, a service, such as a new service, that uses CF and has a limited user base will have to resort to an alternative recommendation approach, at least until it is able to gather a critical mass of users, and/or a sufficient amount of data to model or profile items. Given the vital role recommendation engines play in identifying items for presentation to users, the lack of user data to generate a CF model may put new market players at a competitive disadvantage. Furthermore, even successful CF systems sometimes fail to model new items, which have a dearth of user input. Embodiments of the present disclosure address these and other problems and provide media recommendation using Internet media stream modeling.

In accordance with one or more embodiments, media item recommendation, such as music recommendations, may be made using one or more models generated using data collected from a plurality of media stream sources, such as, for example, Internet radio stations. An initial, bootstrapping phase, uses information about playlists of media streams, which media streams are provided from sources, such as internet radio stations, and information about media items of the media streams to generate a model, which comprises latent factor vectors, or learned profiles, of media items, e.g., tracks, artists, etc. Such a bootstrapping learning phase may be performed without user data, such as user playlists and/or user feedback, to generate a model that may be used to make item recommendations. As user data becomes available, e.g., as users of a recommendation service provide user data, the user data may be used to supplement and/or update the model and/or to create user profiles.

In accordance with one or more embodiments, a method is provided, which method comprises collecting, via at least one computing device, a training data set comprising data about a plurality of playlists of a plurality of media streams, for each occurrence of a media item in a playlist, the training data set comprising information identifying the media item, the playlist, at least one artist associated with the media item, and a timestamp indicating a play time of the media item; generating, via the at least one computing device and using the training data set, at least one latent factor model modeling a plurality of media items and the plurality of media streams; and using, via the at least one computing device, the at least one model generated using the training set comprising data about a plurality of playlists of a plurality of media streams to make a recommendation.

In accordance with at least one embodiment, a system is provided, which system comprises at least one computing device comprising one or more processors to execute and memory to store instructions to: collect a training data set comprising data about a plurality of playlists of a plurality of media streams, for each occurrence of a media item in a playlist, the training data set comprising information identifying the media item, the playlist, at least one artist associated with the media item, and a timestamp indicating a play time of the media item; generate, using the training data set, at least one latent factor model modeling a plurality of media items and the plurality of media streams; and use the at least one model generated using the training set comprising data about a plurality of playlists of a plurality of media streams to make a recommendation.

In accordance with at least one embodiment, a computer-readable non-transitory storage medium for tangibly storing thereon computer readable instructions that when executed cause at least one processor to: collect a training data set comprising data about a plurality of playlists of a plurality of media streams, for each occurrence of a media stream in a playlist, the training data set comprising information identifying the media item, the playlist, at least one artist associated with the media item, and a timestamp indicating a play time of the media item; generate, using the training data set, at least one latent factor model modeling a plurality of media items and the plurality of media streams; and use the at least one model generated using the training set comprising data about a plurality of playlists of a plurality of media streams to make a recommendation.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an illustration of components for use in a system in accordance with one or more embodiments of the present disclosure.

FIG. 2 provides a process flow illustrating functionality of system components in accordance with one or more embodiments of the present disclosure.

FIG. 3 provides a model generation process flow in accordance with one or more embodiments of the present disclosure.

DETAILED DESCRIPTION

Figure 1:
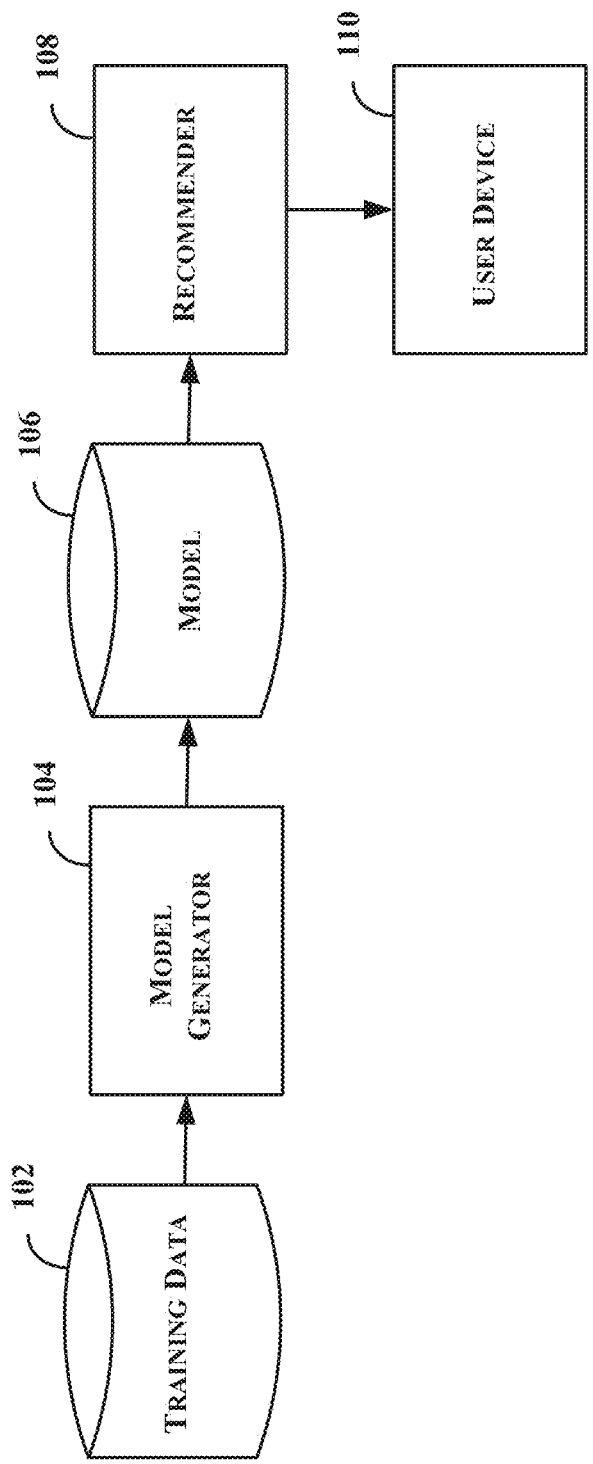

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

While one or more embodiments of the present disclosure may be discussed with reference to a particular type of media, media content or media content item, the present disclosure is not limited to one particular type of media. Embodiments of the present disclosure can be used with any type media, media content or media content item, including without limitation digital content such as audio, video, multimedia, music tracks, songs, movies, television or other programming, commercials, images, slides, etc.

A media stream can be considered to be a collection of media content, and an item in a collection of media content, such as without limitation a media stream, may be referred to as an "item of media content" or a "media content item," and may be retrieved from the media stream or collection.

In general, the present disclosure includes a recommendation system, method and architecture that use a collaborative filtering model generated from training data, which training data comprises data about media items, media streams containing media items, and media stream playlists. While embodiments of the present disclosure may be described using Internet radio stations, Internet radio station playlists, and/or tracks as examples, it should be apparent that embodiments of the present disclosure are applicable to any type of media stream, media stream playlist and/or media item.

In accordance with one or more embodiments, an initial, bootstrapping phase uses information about playlists of media streams, which media streams are provided from sources, such as internet radio stations, and information about media items of the media streams to generate a model, which comprises latent factor vectors, or learned profiles, of items, e.g., tracks, artists, etc. In accordance with one or more embodiments, the bootstrapping phase may be performed without user data, such as user playlists and/or user feedback, to generate a model that may be used to make item recommendations. As user data becomes available, e.g., as users of a recommendation service provide user data, the user data may be used to supplement and/or update the model and/or to create user profiles.

In accordance with one or more embodiments, data is collected about a plurality of playlists, e.g., Internet radio station playlists, and comprises data about media items, e.g., music tracks, played in playlists of Internet radio stations. Unlike other CF approaches, which require user data, e.g., user transactions and feedback, embodiments of the present disclosure use data about a plurality of playlists, e.g., Internet radio station playlists, which comprises data about media items in playlists. In so doing, playlist data may be used in place of user data eliminating a "cold start" problem encountered by other CF approaches that rely on user data to generate a CF model.

The playlist data that comprises a training set is used, in accordance with one or more embodiments, to generate a model, or models, which may be used to make recommendations, such an item, e.g., track or artist, recommendation and/or a station or playlist recommendation. Embodiments of the present disclosure are illustrated using Internet radio station playlists of music items, e.g., tracks or songs; however, playlists of other types of media types are also contemplated.

In accordance with one or more embodiments, a training data comprises data about items in each playlist belonging to a training data set. By way of one non-limiting example, the model that is generated using the training data set is a latent factor model, which characterizes the playlist items and the playlists. The model has a plurality of parameters, including vectors, e.g., latent factor vectors, each vector representing an item or a station playlist. Each vector has a number, l, factors. By way of some non-limiting examples, an item may be a track or an artist. The number of factors may vary. By way of one non-limiting example, the number of factors, l, may be in a range of twenty to fifty. It should be apparent that any number of factors may be used. Another example of a type of vector that may be included in the model parameters is an artist-enhanced vector, which vector may be a combination of a track vector and at least one artist vector for an artist associated with the track. The model parameters may further include an item biases, such as a track bias and/or artist bias. An item bias may reflect a popularity of the item. The model parameters may further include an artist-enhanced bias, which combines track and artist biases for a given track.

In accordance with one or more embodiments, a model may be generated by maximizing a log-likelihood of a probability of observing an item, i, as the item played in station, s, at time, t. In generating a model, the model parameters that are sought are those that maximize the log likelihood of the probability, for each item in the training set. Model parameters are optimized over the training data set, such that the model parameters selected for the model are those that optimize the probability of observing an item, i, in a station's playlist, for all items and station playlists belonging to the training data set. By way of an example, where an item, i, is the next item in a playlist played by a station, the model parameters selected for the model trained for the entire training data, including item, i, reflect a probability, e.g., a high probability, of observing the item as the next item played in station, s. Likewise, where an item, i, is not the next item in a playlist played by a station, the selected model parameters reflect a probability, e.g., a low probability, of observing the item as the next item played in station.

In accordance with one or more embodiments, an affinity function, which characterizes an affinity, or relationship, of an item, i, to a station, s, at time, t. By way of a non-limiting example, the affinity function is a function of a bias, e.g., an artist-enhanced bias, associated with the item, an artist-enhanced vector associated with the item and the vector associated with the station.

FIG. 1 provides a component overview of a system for use in accordance with one or more embodiments. In the example of FIG. 1, as well as any of the other figures provided herein, functionality described in connection with a single component can be performed by more than one component; similarly, two or more components can be combined such that the functionality described in connection with the two or more components is performed by a single component.

Model generator 104 receives a training set, training data set 102, which comprises data about a plurality of station playlists. The training data set 102 may be received from a monitoring service, e.g., an Internet radio station directory service such as that provided by SHOUTcast™. For example, the training data set 102 may be a sampling over a period of time of data collected by a service such as that provided by SHOUTcast™. The training data 102 may comprise information about a plurality of radio stations, which information may include information identifying the station, each track in the station's playlist, at least one artist associated with the track, a timestamp representing a time of play, e.g., start time, for the track.

In accordance with one or more embodiments, stations that are used may be a sampling of a plurality of genres and may include stations that are not necessarily dedicated to music, for example stations under the sports and news subdirectories. The selected stations need not be limited to a given country.

By way of a non-limiting example, metadata provided by a monitoring service may be parsed, in accordance with a protocol or syntax used by the service, to extract such information as artist and track titles.

In accordance with one or more embodiments, model generator 104 models the training data set 102 using a latent factor model, where each playlist induces a probability distribution over the items of the playlist. Model parameters are learned in order to maximize the probability of playing the playlist items. The model directly captures the relations between tracks and their corresponding artists, thereby indirectly tying all tracks belonging to the same artist. In addition, the model utilizes temporal effects underlying the data. In accordance with one or more embodiments, playlists are modeled, such that, given a playlist, the model predicts the probability distribution of the next played item. The model maps both items and stations to latent factor vectors in a latent factor vector space, R, each vector having l factors. Each item i may be mapped into a vector, $p_i \in R^l$, and each station, s, may mapped into a vector, $v_s \in R^l$. Model parameters may be denoted by $\Theta$.

By way of a non-limiting example, items are arranged within playlists associated with stations, which items may refer to both tracks and artists. A timestamp, t, may represent a time of play of a track, which time may correspond to the start of play of a track. An artist playing track i may be denoted by a(i). A sequence $P_s$ may be used to denote a list of tracks played by station s along with their associated timestamps, which playlists are arranged within a train set S.

As discussed herein, biases may be associated with items, and a bias of an item i may be denoted by $c_i \in R$. A bias may be used to reflect a popularity level of an item. By way of some non-limiting examples, a bias value that is high relative to other bias values may indicate that an item is universally liked, and a low value, in relative terms, may indicate that an item is universally disliked.

Since musical artists often have a distinct style that can be recognized in all their songs, for tracks by the same artist, model parameters may be shared to reflect the affinity of the tracks by the same artist. Parameters associated with a track, i, can sum both its own specific representation, together with the one associated with its artist (a(i)). This is helpful, for example, in modeling sparsely observed tracks. Each track, i, can be associated with an artist-enhanced latent factor vector, which may be represented as $q_i \equiv p_i + p_{a(i)}$. Similarly, an artist-enhanced bias of track i may be represented as $b_i \equiv c_i + c_{a(i)}$.

The affinity of item, i, to station, s, at time, t, may be denoted as $r_{si;t}$. Accordingly, given a target station at a certain time, items can be ranked by their decreasing affinity values. The likelihood of observing i as the item played in station s at time t may be modeled by the multinomial distribution:

$$P(i|s; t, \Theta) = \frac{\exp(r_{si;t})}{\sum_j \exp(r_{sj;t})}, \quad \text{Eq. (1)}$$

where exp is an exponential function.

For purposes of simplification, the symbol $\Theta$ representing the model parameters may be omitted from the above probability notation, and in such case the notation P(i|s;t) may be used to represent the same multinomial distribution. In accordance with one or more embodiments, a model generator 106 selects the model parameters that maximize the log-likelihood of observing the training set 102, e.g., the model parameters that closely parallel the "observations" provided by the training set 102. As is discussed below, $r_{si;t}$ represents a scalar value representing a determined affinity, or relationship of item, i, to station, s, at time, t. In accordance with one or more embodiments, the log-likelihood of observing the training set 102 may be based on such a probability function, which may be based on an affinity function. One example of such an affinity function is as follows:

$$r_{si;t} \equiv b_i + q_i^T v_s \quad \text{Eq. (2)}$$

In Eq. (2), the affinity of item, i, to station, s, at time, t, is dependent on an inner product between a latent factor vector associated with station, s, e.g., $v_s$, and a latent factor vector associated with item, i, and may be further based on a bias, $b_i$, associated with item, i. In the example of Eq. (2), the latent factor vector associated with item, i, is an artist-enhanced latent factor vector, $q_i$ discussed above. Additionally, in the example Eq. (2) shown above, T denotes a transpose of latent factor vector, $q_i$.

In accordance with one or more embodiments, the affinity function of Eq. (2) may be modified to take into account that stations are likely to play different kinds of music during different times of the day, e.g., during different programs presented by the station. The day may be split into different time slots, e.g., 8 equal slots (12 am-3 am, 3 am-6 am, 6 am-9 am, etc.), although alternative choices are also contemplated. A notation, e.g., $1 \leq \text{slot}(t) \leq 8$, may be used to represent the integer denoting the slot corresponding to time, t. A station profile during time slot, k, may be denoted by latent factor vector $v_s^{(k)} \in R^l$, which may be included in the model parameters, $\Theta$.

It may be expected that adjacently played items are more closely related relative to other items. Such an expectation may be based on the increased chance that both were played in a same program of the station, and also from a tendency of playlist editors to impose "smoothness", or smooth transitions, between closely played items. A set of tracks played in station, s, during time, [t−w, t), may be denoted as $P_x^{(t,w)}$. By way of a non-limiting example, the time window, w, may be thirty minutes, although any time window is contemplated. Using item vectors, the set of items within a time window may be characterized by the vector $$|P_s^{(t,w)}|^{-0.5} \sum_{j \in P_s^{(t,w)}} q_j.$$

In accordance with one or more embodiments, Eq. (2) may be modified to account for temporal effects discussed above, as follows:

$$r_{si;t} \equiv b_i + q_i^T \left( v_s^{(slot(t))} + \frac{1}{\sqrt{|P_s^{(t,w)}|}} \sum_{j \in P_s^{(t,w)}} q_j \right)$$

As discussed herein, in accordance with one or more embodiments, model generator 104 may be used to generate a model having model parameters, $\Theta$, that maximize the log-likelihood of the training set 102. The log-likelihood function may be represented as follows:

$$L(S; \Theta) \equiv \sum_{P_s \in S} \sum_{(i,t) \in P_s} \log P(i|s; t, \Theta)$$

For each item, e.g., an item i played at time t, of a station playlist $P_s$, the probability of observing item, i, as the item played on station s at time t is determined using the model parameters, $\Theta$. In accordance with one or more embodiments, a playlist, $P_s$, may contain multiple occurrences of the same item, e.g., the same item may appear more than once in a playlist. In the log-likelihood function shown in Eq. (4), the probabilities for items of a given playlist $P_s$, are summed and the resulting playlist probability values are summed for all playlists to yield a value for the log-likelihood function. In accordance with one or more embodiments, model parameters are selected that yield a maximum value. The model parameters may be varied to yield various log-likelihood values for the training set 102, and a set of model parameters, $\Theta$, may be determined that maximize the log-likelihood for the training set 102. By way of one non-limiting example, item biases may be tweaked or varied to yield a desired set of model having model parameters that maximize the log-likelihood for the training set 102. By way of a further non-limiting example, magnitudes of factors in the latent factor vectors may be varied.

In accordance with one or more embodiments, a model 106, which comprises model parameters, $\Theta$, is generated by model generator 104. The model parameters may be used by recommender 108 to make a recommendation to a user using user device 110. By way of some non-limiting examples, a recommendation may be a recommendation of one or more stations and/or items, which recommendation may be based on a similarity determined by comparing latent factor vectors of the model 106. For example, a similarity between two stations or items may be determined by comparing the associated latent factor vectors, e.g., by taking the dot product or using a cosine function. In accordance with one or more embodiments, model generation may be performed using a learning process that applies stochastic gradient ascent, which is described below.

In one exemplary application, media item vectors may be compared to determine similarities or dissimilarities, which similarities/dissimilarities may be used to identify items for recommendation. By way of some non-limiting examples, track vectors may compared to identify a degree of similarity or dissimilarity between tracks, or artist vectors may be compared to identify similarity, or lack thereof, between artists. Media item recommendations may be made based on such comparisons.

By way of a further non-limiting example, given a seed item, which seed item may be an item liked, or disliked, by a user, the seed item's latent factor vector may be compared to the latent factor vector of one or more other item to determine a similarity between the seed and the one or more other items. The one or more other items may be selected for recommendation to the user based on the determined similarities. Where the user likes the seed item and there is a desire to identify one or more other items similar to the seed item, those items determined to be similar to the seed item may be selected. It should be apparent that a lack of similarity may also be used to select one or more of the other items, where a desire is to select items dissimilar to the seed item, such as in a case that a user disliked the seed item or for whatever reason there is a desire for items that are unlike the seed item. Likewise, station latent factor vectors may be compared to identify similar and/or dissimilar stations, which information may be used to make a recommendation of one or more stations.

In accordance with one or more embodiments, a station's latent factor vector may be compared with an item's latent factor vector to identify a degree of similarity or dissimilarity, which degree of similarity or dissimilarity may be used to make an item recommendation based on a station or vice versa. In accordance with one or more embodiments, the seed item and/or station may be based on user preferences, user item and/or station selections and/or user feedback. Alternatively, a seed item and/or station may be based on other information about a user, such as user age, gender, etc. As yet another alternative, a seed may be randomly selected.

In accordance with one or more embodiments, a user latent factor vector, $p_u$, may be defined as:

$$p_u = \frac{1}{\sqrt{|S_u| + |N_u|}} \left( \sum_{i \in S_u} q_i - \sum_{i \in N_u} q_i \right), \quad \text{Eq. (5)}$$

wherein $S_u$ is the set of tracks positively rated by a user, u, and $N_u$ is the set of tracks negatively rated by user, u. Alternatively, a user latent factor vector, $p_u$, may be defined without the set, $N_u$, e.g., in a case that such information is not available. Such a user latent factor vector, $p_u$, may be defined as follows:

$$p_u = \frac{1}{\sqrt{|S_u|}} \sum_{i \in S_u} q_i \quad \text{Eq. (6)}$$

In accordance with one or more embodiments, a degree of similarity/dissimilarity between two users may be determined by comparing the users' latent factor vectors. In accordance with one or more such embodiments, an item or station may be selected for one user based another user's likes/dislikes, where the other user is determined to be similar, or dissimilar, using each user's user vector, $p_u$.

In accordance with one or more embodiments, a user, u, may be matched with tracks that maximize:

$$\alpha b_i + p_u^T q_i, \quad \text{Eq. (7)}$$

where $\alpha$ may be used to specify an extent of biasing towards more popular tracks. By way of a non-limiting example, a value may be determined using Eq. (7) for a number of tracks, i, and a number of the tracks having the largest determined values may be selected for a user, u.

In accordance with one or more embodiments, a new station may be added to the model without re-training the model 106. Eqs. (2) and (3) may be modified to allow incorporation of new stations. When a new station, s, is introduced, an affinity, $r_{s,i;t}$ of item, i, affinity to a station, s, at time t may be represented as:

$$r_{s,i;t} \equiv b_i + q_i^T \left( \frac{1}{\sqrt{|P_s|}} \sum_{j \in P_s} q_j + \frac{1}{\sqrt{|P_s^{(t,w)}|}} \sum_{j \in P_s^{(t,w)}} q_j \right), \quad \text{Eq. (8)}$$

where a station, s, may be profiled through its playlist, $P_s$, such that the latent factor vector, $v_s$, may be replaced with the vector $$\frac{1}{\sqrt{|P_s|}} \sum_{j \in P_s} q_j + \frac{1}{\sqrt{|P_s^{(t,w)}|}} \sum_{j \in P_s^{(t,w)}} q_j,$$

using the artist-enhanced vector for each item, j, in the playlist, $P_s$, of the new station, s.

In accordance with one or more alternate embodiments, a station, s, may be profiled through its playlist, $P_s$, and the latent factor vector, $v_s$, for the station, s, may be replaced with $|P_s|^{-0.5} \Sigma_{j \in P_s} q_j$, as discussed above. Additionally, each item of the new playlist may be mapped into three latent factor vectors $p_i^{(1)}, p_i^{(2)}, p_i^{(3)} \in R^l$, where i represents an item in the new playlist. The three latent factor vectors correspond to three distinct roles an item assumes: being recommended, annotating a station, and annotating a time window. An artist-enhanced latent factor vectors may be represented using the three summed vectors for track i, as follows:

$$q_i^{(1)} = p_i^{(1)} + p_{a(i)}^{(1)}, q_i^{(2)} = p_i^{(2)} + p_{a(i)}^{(2)}, q_i^{(3)} = p_i^{(3)} + p_{a(i)}^{(3)}, \quad \text{Eq. (9)}$$

and, an affinity function representing an affinity between station s and item i at time t may be defined as:

$$r_{s,i;t} \equiv b_i + (q_i^{(1)})^T \left( \frac{1}{\sqrt{|P_s|}} \sum_{j \in P_s} q_j^{(2)} + \frac{1}{\sqrt{|P_s^{(t,w)}|}} \sum_{j \in P_s^{(t,w)}} q_j^{(3)} \right) \quad \text{Eq. (10)}$$

As discussed, the model parameters may be determined so as to maximize the log-likelihood of the train data. In accordance with the alternative embodiments, since none of the model parameters describe stations, handling a new station is trivial. Namely, existing stations, rapidly updated stations, and new users may each use the same affinity function, e.g., Eq. (10), which allows ranking items without needing to retrain the model.

Figure 2:
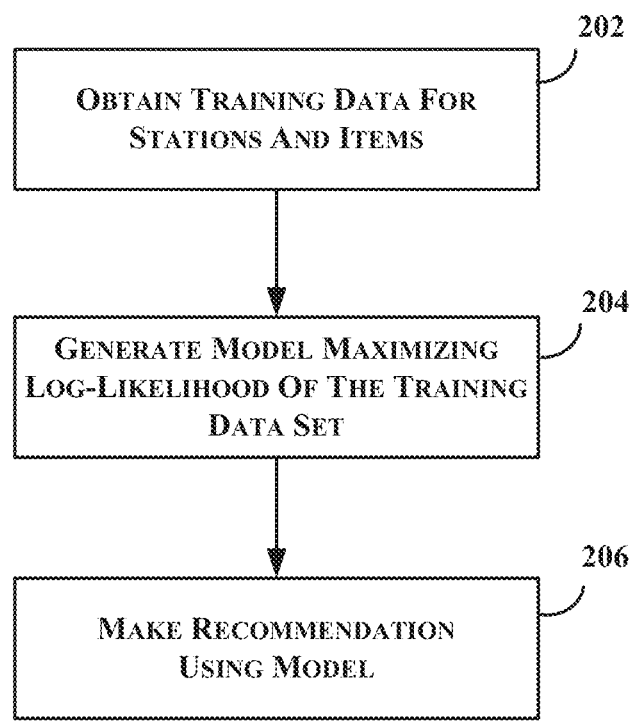

FIG. 2 provides a process flow illustrating functionality of system components in accordance with one or more embodiments of the present disclosure. The functionality may be performed by model generator 104 and recommender 108, for example.

At step 202, training data, e.g., training data set 102, is obtained. Step 202 may be performed by model generator 104. As discussed herein, training data may be collected from a service such as that provided by SHOUTcast™, which may be in the form of metadata. The metadata may be parsed, in accordance with a protocol or syntax used by the service, to extract data to be used for the training data. Such data may comprise, information about a plurality of stations/playlists, tracks, artists and play times.

At step 204, a model is generated, e.g., by model generator 104. As discussed herein, the model comprises a plurality of model parameters, Θ, which may be identified using an iterative process, which may be repeated to identify an optimal set of parameters for the model, e.g., model 106.

Figure 3:
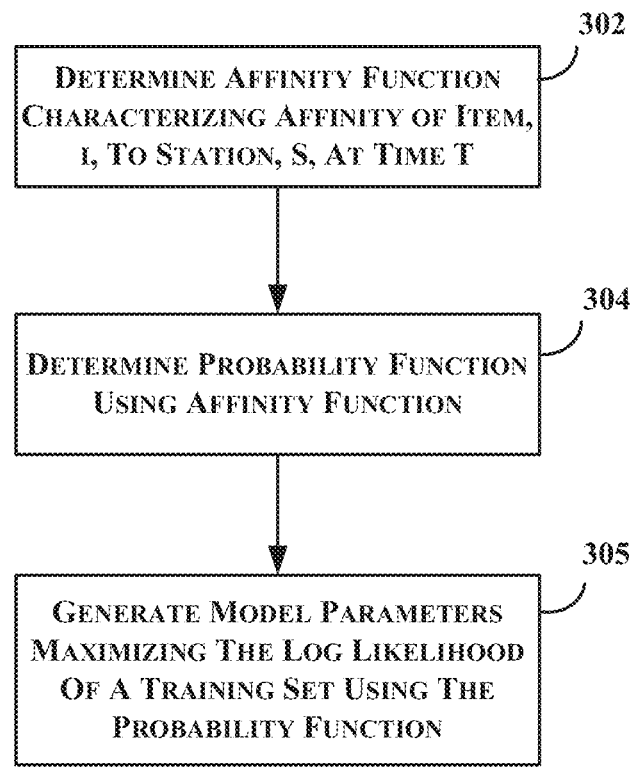

As discussed above, in accordance with one or more embodiments, model parameters, Θ, are selected so as to maximize a log-likelihood of the training data set 102 using Eq. (4), which maximizes a probability function that is based on an affinity function. FIG. 3 provides a model generation process flow in accordance with one or more embodiments of the present disclosure.

At step 302, an affinity function, e.g., Eq. (2) or Eq. (3), is determined for use with a plurality of items and playlists, each item, i, being played at a time, t, by a station, s, and the affinity function characterizes an affinity, or relationship, between item, i, to station, s, at time, t.

At step 304, a probability function is determined using the affinity function determined in step 302. The probability function, e.g., a multinomial distribution, models a likelihood of observing, i, as the item played in station, s, at time, t. Eq. (1) provides an example of a probability function for use in accordance with at least one embodiment. At step 305, model parameters are generated for a model, e.g., model 106, by maximizing the log-likelihood of a training set, 102, using the probability function determined in step 304. As discussed herein, the model may comprise a plurality of model parameters, Θ, including without limitation latent factor vectors, such as track, artist, station, user, and artist-enhanced vectors, and biases, such as item, artist and artist-enhanced biases.

Returning to FIG. 2, a generated model, e.g., model 106, may be used to make a recommendation, such as one or more items and/or stations, at step 206, as discussed above, for example.

In accordance with one or more embodiments, an optimization technique, such as stochastic gradient ascent, may be used in generating a model 106. Given a training example (s, i, t) each parameter θ∈Θ may be updated using the following equation, which determines a change, Δθ, in a parameter, θ, of the model parameters, Θ:

$$\Delta\theta = \eta \frac{\partial \log_e P(i|s;t)}{\partial \theta} = \eta \left( \frac{\partial r_{si;t}}{\partial \theta} - \sum_j P(j|s;t) \frac{\partial r_{sj;t}}{\partial \theta} \right), \quad \text{Eq. (11)}$$

where η is a learning rate and ∂ denotes a partial derivative. Eq. (11) uses a multinomial distribution and an affinity function, such as those described above.

In the above example, each update sums over all items, which might be too slow to be practical. Thus, a sampling of the weighted sum may be used. By way of a non-limiting example, a sampling of the weighed sum in Eq. (11) may be used. Such a scheme may be based on importance sampling, such as that proposed in Y. Bengio and J. S. Senécal, "Quick training of probabilistic neural nets by sampling" *Proc. 9th International Workshop on Artificial Intelligence and Statistics (AISTATS'03)*, 2003, which is incorporated herein by reference.

In accordance with one or more embodiments, using importance sampling, items may be drawn according to a proposal distribution, which proposal distribution is denoted by P(i|S), and each item may be assigned a probability proportional to its empirical frequency in the train set. Items are sampled with replacement from P(i|S) into a set, J. By way of a non-limiting example, a tuple, (s, i, t), from the training set may be uniformly sampled, and i may be added to set, J. Probabilities, P(i|s;t), which may be expensive to compute, may be approximated using a weighting scheme, such as the following weighting scheme, for example:

$$w(i|s) = \frac{\exp(r_{si;t})/P(i|S)}{\sum_{j\in J} \exp(r_{sj;t})/P(j|S)}$$

The approximated gradient ascent step given training example (s, i, t) may be:

$$\Delta\theta = \eta \left( \frac{\partial r_{si;t}}{\partial \theta} - \sum_{j\in J} w(j|s) \frac{\partial r_{sj;t}}{\partial \theta} \right)$$

In accordance with one or more embodiments, the size of set, J, may grow as the training process proceeds, as more delicate parameter adjustments may be needed at later training phases. In accordance with one or more embodiments, the sample size, (|J|), may be controlled using a rule that is based on a current estimate's fitness. By way of one non-limiting example, given a training example (s, i, t), sampling items may be kept in set, J, until satisfying the following:

$$\sum_{j\in J} P(j|s;t) > P(i|s;t) \Leftrightarrow \sum_{j\in J} \exp(r_{sj;t}) > \exp(r_{si;t})$$

An adaptive sampling automatically lets the sample size grow when parameters are nearing final values and the correct item is getting a relatively high probability. In accordance with one or more embodiments, a maximal sample size may be limited. Any maximal size is contemplated; by way of a non-limiting example, such sample size might be 1000.

In accordance with one or more embodiments, a learning algorithm may be further tuned. By way of some non-limiting examples, the process may be run for a number of sweeps, such as without limitation 20 sweeps, over the training data. During a $k^{th}$ sweep, the learning rate, η, might be set to a value, such as without limitation η=0.005/k, based on validation data performance. Regularization may be used to avoid overfitting, which regularization may be used with a factorization-based recommender in accordance with one or more embodiments of the present disclosure. By way of a non-limiting example, one type of regularization that might be used is weight decay, which penalizes the squared magnitude of each learned parameter, such as that described in Y. Koren, R. M. Bell, and C. Volinsky, "Matrix factorization techniques for recommender systems," *IEEE Computer*, 42(8):30-37, 2009, which is incorporated herein by reference. In accordance with such an approach, a normal prior centered at zero is assumed for each parameter. Weight decay may have a very minor positive impact on generalization performance, such that a weight decay constant might be set to $10^{-4}$, for example. Additionally, for numerical stability in exponentiation operations, parameters may be clipped to the [−1, 1] range during the learning procedure.

Figure 4:
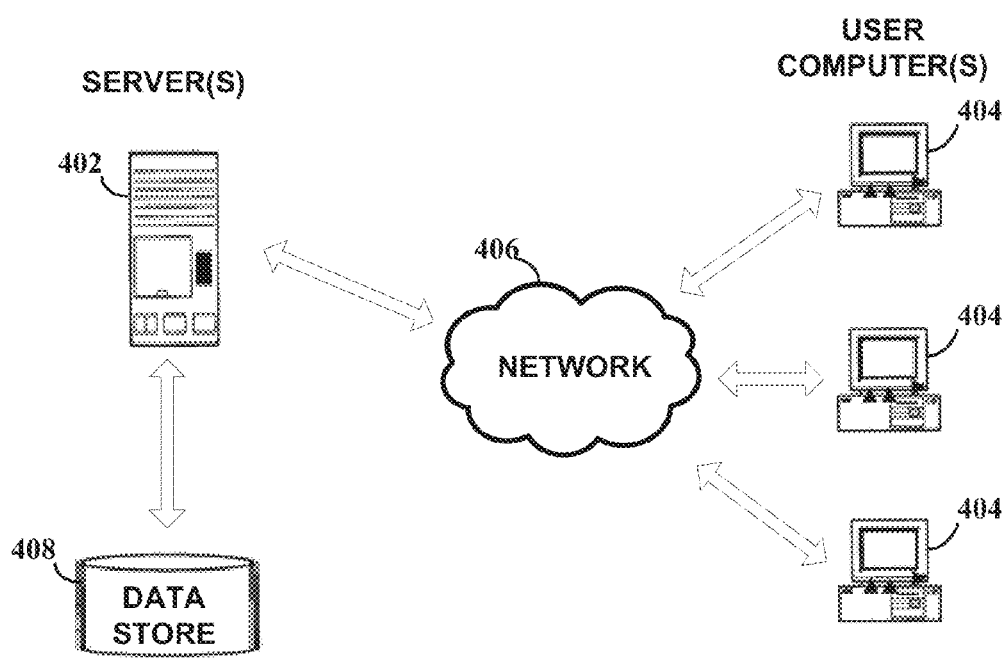
FIG. 4 illustrates some components that can be used in connection with one or more embodiments of the present disclosure.

FIG. 4 illustrates some components that can be used in connection with one or more embodiments of the present disclosure. In accordance with one or more embodiments of the present disclosure, one or more computing devices, e.g., one or more servers, user devices 110 or other computing device, are configured to comprise functionality described herein. For example, a computing device 402 can be configured to execute program code, instructions, etc. to provide functionality in accordance with one or more embodiments of the present disclosure. The same or another computing device 402 may be configured to provide model generator 102 and recommender 108.

Computing device 402 can serve content to user computing devices 404 using a browser application via a network 406. Data store 408, which can include data such as training data 102, model 106, program code to configure a server 402 to provide functionality described in connection with one or more embodiments of the present disclosure.

The user computing device 404, and/or user device 110, can be any computing device, including without limitation a personal computer, personal digital assistant (PDA), wireless device, cell phone, Internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 402 and the user computing device 404 can include one or more processors, memory, a removable media reader, network interface, display and interface, and one or more input devices, e.g., keyboard, keypad, mouse, etc. and input device interface, for example. One skilled in the art will recognize that server 402 and user computing device 404 may be configured in many different ways and implemented using many different combinations of hardware, software, or firmware.

In accordance with one or more embodiments, a computing device 402 can make a user interface available to a user computing device 404 via the network 406. The user interface made available to the user computing device 404 can include content items, or identifiers (e.g., URLs) selected for the user interface in accordance with one or more embodiments of the present invention. In accordance with one or more embodiments, computing device 402 makes a user interface available to a user computing device 404 by communicating a definition of the user interface to the user computing device 404 via the network 406. The user interface definition can be specified using any of a number of languages, including without limitation a markup language such as Hypertext Markup Language, scripts, applets and the like. The user interface definition can be processed by an application executing on the user computing device 404, such as a browser application, to output the user interface on a display coupled, e.g., a display directly or indirectly connected, to the user computing device 404.

In an embodiment the network 406 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

A network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 6nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 4. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 5:
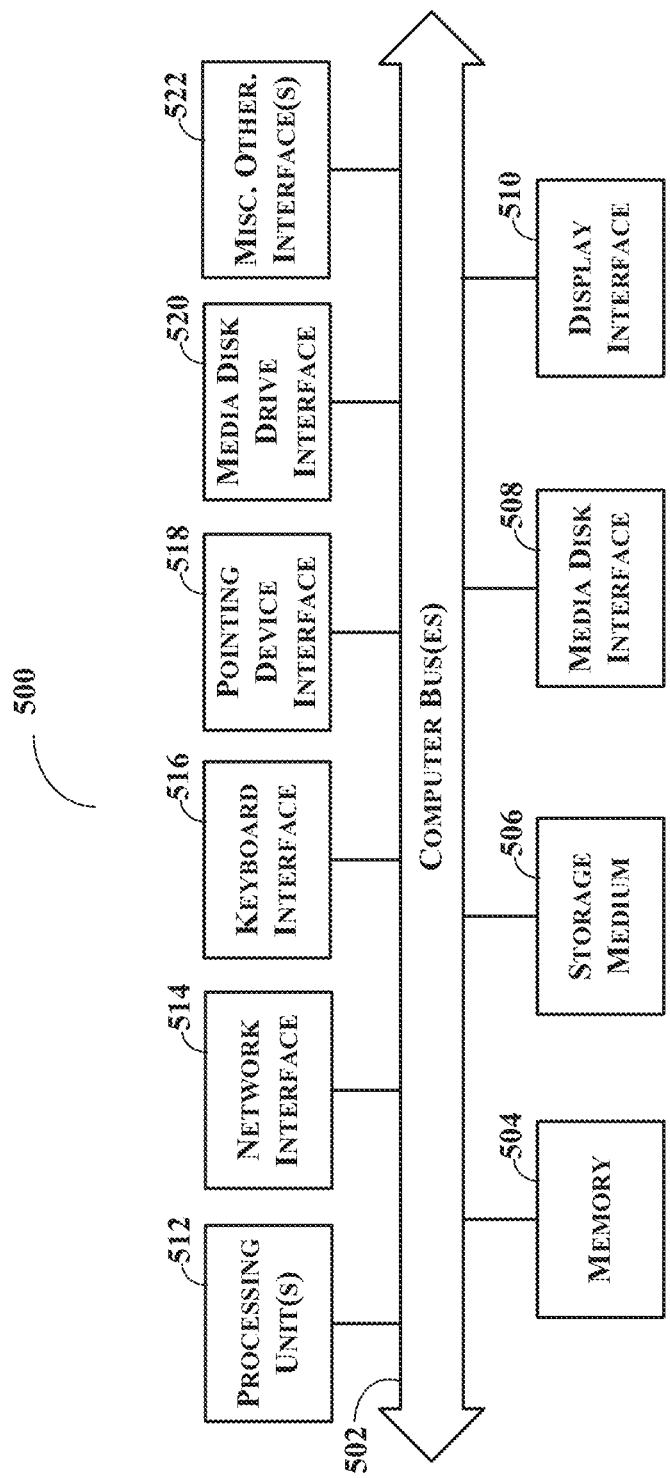
FIG. 5 is a detailed block diagram illustrating an internal architecture of a computing device in accordance with one or more embodiments of the present disclosure.

FIG. 5 is a detailed block diagram illustrating an internal architecture of a computing device, e.g., a computing device such as server 402 or user computing device 404, in accordance with one or more embodiments of the present disclosure. As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), etc., media disk drive interface 520 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, computer-readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    collecting, via at least one computing device, a training data set comprising data about a plurality of playlists of a plurality of media streams from a number of Internet streaming media stations, for each occurrence of a media item in a playlist, the training data set comprising information identifying the media item, the playlist, at least one artist associated with the media item, and a timestamp indicating a play time of the media item;

generating, via the at least one computing device, at least one latent factor model using the training data set, the at least one latent factor model modeling a plurality of media items and the plurality of media streams, the at least one latent factor model is at least initially generated without using user data identifying user media item preferences, the training data at least initially being used in place of the user data to generate the at least one latent factor model; and using, via the at least one computing device, the at least one latent factor model to make a number of recommendations, at least one recommendation of the number being made using the at least one latent factor model generated without using the user data.

2. The method of claim 1, the at least one latent factor model comprising a bias for at least one media item of the plurality of media items.

3. The method of claim 2, the media item's bias comprises an artist-enhanced bias which is based on a bias for the media item and a bias for an artist associated with the media item.

4. The method of claim 1, the using the at least one latent factor model to make a recommendation, further comprising:

comparing, via the at least one computing device, latent factor vectors of two or more media items of the plurality of media items to identify similar media items, the at least one latent factor model comprising a plurality of latent factor vectors modeling the plurality of media items, wherein the recommendation comprises the similar media items.

5. The method of claim 1, the using the at least one latent factor model to make a recommendation, further comprising:

comparing, via the at least one computing device, latent factor vectors of two or more media streams of the plurality of media streams to identify similar media streams, the at least one latent factor model comprising a plurality of latent factor vectors modeling the plurality of media streams, wherein the recommendation comprises the similar media streams.

6. The method of claim 1, the generating at least one latent factor model characterizing the plurality of media items and the plurality of media streams further comprising:

determining, via the at least one computing device, a log-likelihood maximizing a probability function characterizing a probability of observing a media item, i, as the media item played in a media stream, s, at a time, t.

7. The method of claim 6, wherein the probability function uses an affinity function characterizing an affinity of the media item, i, to the media stream, s, at the time, t.

8. The method of claim 7, wherein the affinity function uses a bias of the media item and latent factor vectors for the media item and the media stream, wherein the bias comprises an artist-enhanced bias, $b_i$, and the media item's latent factor vector is an artist-enhanced latent factor vector, $q_i$.

9. The method of claim 8, the plurality of media items comprising a plurality of music tracks.

10. The method of claim 1, further comprising:

obtaining, via the at least one computing device, user data comprising media item feedback from one or more users; and updating, via the at least one computing device, the at least one latent factor model using the media item feedback from the one or more users.

11. A system comprising:

at least one computing device, each computing device comprising a processor and a storage medium for tangibly storing thereon program logic for execution by the processor, the stored program logic comprising:

collecting logic executed by the processor for collecting a training data set comprising data about a plurality of playlists of a plurality of media streams from a number of Internet streaming media stations, for each occurrence of a media item in a playlist, the training data set comprising information identifying the media item, the playlist, at least one artist associated with the media item, and a timestamp indicating a play time of the media item;

generating logic executed by the processor for generating at least one latent factor model using the training data set, the at least one latent factor model modeling a plurality of media items and the plurality of media streams, the at least one latent factor model is at least initially generated without using user data identifying user media item preferences, the training data at least initially being used in place of the user data to generate the at least one latent factor model; and using logic executed by the processor for using the at least one latent factor model to make a number of recommendations, at least one recommendation of the number made using the at least one latent factor model being made without using user data.

12. The system of claim 11, the at least one latent factor model comprising a bias for at least one media item of the plurality of media items.

13. The system of claim 12, the media item's bias comprises an artist-enhanced bias which is based on a bias for the media item and a bias for an artist associated with the media item.

14. The system of claim 11, the using logic executed by the processor for using the at least one latent factor model to make a recommendation further comprising:

comparing logic executed by the processor for comparing latent factor vectors of two or more media items of the plurality of media items to identify similar media items, the at least one latent factor model comprising a plurality of latent factor vectors modeling the plurality of media items, wherein the recommendation comprises the similar media items.

15. The system of claim 11, the using logic executed by the processor for using the at least one latent factor model to make a recommendation further comprising:

comparing logic executed by the processor for comparing latent factor vectors of two or more media streams of the plurality of media streams to identify similar media streams, the at least one latent factor model comprising a plurality of latent factor vectors modeling the plurality of media streams, wherein the recommendation comprises the similar media streams.

16. The system of claim 11, the generating logic executed by the processor for generating at least one latent factor model characterizing the plurality of media items and the plurality of media streams further comprising:
determining logic executed by the processor for determining a log-likelihood maximizing a probability function characterizing a probability of observing a media item, i, as the media item played in a media stream, s, at a time, t.

17. The system of claim 16, wherein the probability function uses an affinity function characterizing an affinity of the item, i, to the media stream, s, at the time, t.

18. The system of claim 17, wherein the affinity function uses a bias of the media item and latent factor vectors for the media item and the media stream, wherein the bias comprises an artist-enhanced bias, $b_i$, and the media item's latent factor vector is an artist-enhanced latent factor vector, $q_i$.

19. The system of claim 18, the plurality of media items comprising a plurality of music tracks.

20. The system of claim 11, the stored program logic further comprising:
obtaining logic executed by the processor for obtaining user data comprising media item feedback from one or more users; and
updating logic executed by the processor for updating the at least one latent factor model using the media item feedback from the one or more users.

21. A computer readable non-transitory storage medium for tangibly storing thereon computer readable instructions that when executed cause at least one processor to:
collect a training data set comprising data about a plurality of playlists of a plurality of media streams from a number of Internet streaming media stations, for each occurrence of a media item in a playlist, the training data set comprising information identifying the media item, the playlist, at least one artist associated with the media item, and a timestamp indicating a play time of the media item;
generate at least one latent factor model using the training data set, the at least one latent factor model modeling a plurality of media items and the plurality of media streams, the at least one latent factor model is at least initially generated without using user data identifying user media item preferences, the training data at least initially being used in place of the user data to generate the at least one latent factor model; and
use the at least one latent factor model to make a number of recommendations, at least one recommendation of the number made using the at least one latent factor model being made without using user data.

22. The computer readable non-transitory storage medium of claim 21, the at least one latent factor model comprising a bias for at least one media item of the plurality of media items.

23. The computer readable non-transitory storage medium of claim 22, the media item's bias comprises an artist-enhanced bias which is based on a bias for the media item and a bias for an artist associated with the media item.

24. The computer readable non-transitory storage medium of claim 21, the instruction to use the at least one latent factor model to make a recommendation further comprising instructions to:
compare latent factor vectors of two or more media items of the plurality of media items to identify similar media items, the at least one latent factor model comprising a plurality of latent factor vectors modeling the plurality of media items,
wherein the recommendation comprises the similar media items.

25. The computer readable non-transitory storage medium of claim 21, the instruction to use the at least one latent factor model to make a recommendation further comprising instructions to:
compare latent factor vectors of two or more media streams of plurality of media streams to identify similar media streams, the at least one latent factor model comprising a plurality of latent factor vectors modeling the plurality of media streams,
wherein the recommendation comprises the similar media streams.

26. The computer readable non-transitory storage medium of claim 21, the instructions to generate at least one latent factor model characterizing the plurality of media items and the plurality of media streams further comprising instructions to:
determine a log-likelihood maximizing a probability function characterizing a probability of observing a media item, i, as the media item played in a media stream, s, at a time, t.

27. The computer readable non-transitory storage medium of claim 26, wherein the probability function uses an affinity function characterizing an affinity of the media item, i, to the media stream, s, at the time, t.

28. The computer readable non-transitory storage medium of claim 27, wherein the affinity function uses a bias of the media item and latent factor vectors for the media item and the media stream, wherein the bias comprises an artist-enhanced bias, $b_i$, and the media item's latent factor vector is an artist-enhanced latent factor vector, $q_i$.

29. The computer readable non-transitory storage medium of claim 28, the plurality of media items comprising a plurality of music tracks.

30. The computer readable non-transitory storage medium of claim 21, the instructions further comprising instructions to:
obtain user data comprising media item feedback from one or more users; and
update the at least one latent factor model using the media item feedback from the one or more users.

* * * * *